Patented June 25, 1935

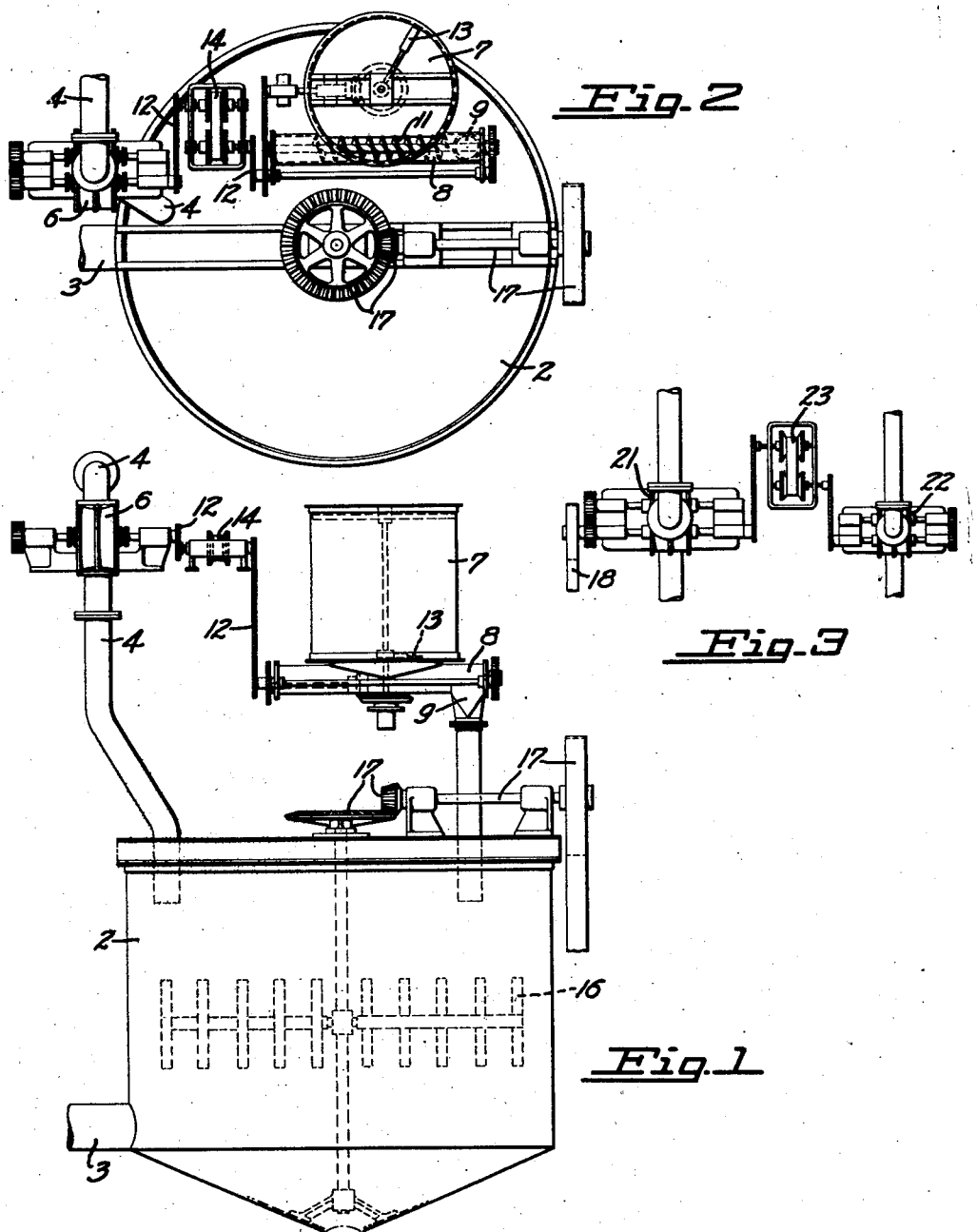

2,005,950

UNITED STATES PATENT OFFICE 2,005,950

APPARATUS FOR PROPORTIONING INGREDIENTS

Carl J. Moroney, San Mateo, and William O. Witherspoon, Burlingame, Calif.

Application May 1, 1933, Serial No. 668,804

1 Claim. (Cl. 137—165)

Our invention relates to the proportioning of ingredients in a mixture.

It is among the objects of our invention to provide a means for accurately controlling the proportions of ingredients in a mixture.

Another object of our invention is to provide apparatus for carrying out our invention.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claim.

Referring to the drawing:

Figure 1 is a side elevational view of the apparatus embodying our invention; and Figure 2 is a plan view of the same.

Figure 3 is a plan view showing a modified form of apparatus embodying the improvements of our invention.

The apparatus for carrying out our invention preferably comprises a receptacle, together with a plurality of constant displacement units connected with supplies of the ingredients and discharging into the receptacle. Means are provided for synchronizing the operation of the units, and means are provided for varying the speed of operation of one of the units relative to the other. Means are also preferably provided for stirring the ingredients in the receptacle.

In greater detail, and referring to the drawing, Figures 1 and 2 show a form of apparatus for proportionally mixing liquid and solid materials; the supply of liquid being under pressure. The apparatus comprises a receptacle or mixing chamber 2 having a suitable outlet duct 3. A duct 4 connecting with the source of liquid under pressure and discharging into the receptacle or tank 2 is provided for conducting the liquid to the tank, and a unit 6 having an element which moves in predetermined timed relation relative to the amount of liquid which passes the unit is interposed in this duct. The unit shown is a constant displacement rotary motor, the impeller or rotor of which constitutes the element which moves in the predetermined timed relation relative to the amount of liquid which flows in the duct. We have experienced good results by using a "Connersville" cycloidal pump of the 2-lobe type for this purpose.

A hopper 7 is preferably provided for holding a supply of the solid ingredient, which material may be in granular, powder or any other suitable form. The hopper is ported into a horizontal duct 8 having a spout portion 9 discharging into the tank 2. A suitable unit is provided for feeding the material along the duct and into the tank. This is preferably in the nature of a feed screw 11 mounted for rotation with the impeller of the motor 6 by suitable connecting means 12. In order to assist the material in reaching the feed screw, a movable agitator arm 13 is provided in the hopper 7, and is also mounted for rotation with the motor 6.

The operation of the feed screw 11 by the motor 6 not only provides a self-driven apparatus, but synchronizes the operation of the units, and insures that the amount of the solid material delivered to the tank will be in direct proportion to the amount of liquid being delivered to the tank, irrespective of what the flow of liquid may be or how it may vary.

Means are provided for adjusting the rate of delivery of the solid material relative to the flow of liquid, so that a selected proportioning of the ingredients may be attained in the mixing tank. This is accomplished by providing a speed change device, such as the "Reeves" speed change 14, in the drive connection 12 between the feed screw 11 and motor 6. By speeding up or slowing down the rotation of the feed screw 11 relative to the R. P. M. of the motor 6, the relative rates at which the several ingredients are fed to the tank are altered. For each setting of the speed change there will be a definite proportioning of the ingredients.

A suitable stirring paddle 16 is preferably mounted in the tank 2 for mixing the materials. The paddle 16 is preferably rotatably mounted and is actuated by a suitable drive 17.

In the event that the liquid is not available under pressure, the motor 6 is operated as a pump and is driven from a suitable external source of power. Such an arrangement is shown in Figure 3 of the drawing, in which a belt drive 18 is provided for rotating the pump 21. Figure 3 also illustrates a variant form of our invention, in which the second ingredient is another liquid instead of the granular material. Instead of the hopper and feed screw arrangement, another constant displacement fluid pump 22 similar to the pump 21 is provided. These two constant displacement pumps are connected together so that both are actuated by the drive means 18, and a suitable speed change 23 is interposed in the connection between the pumps. By this arrangement the two pumping units are synchronized, and the quantity of fluid delivered by one unit will be proportional to that delivered by the other unit. As was true in the first described apparatus, an adjustment of the speed change 23 provides means for varying the ratio of proportionality between the ingredients.

When two or more granular materials comprise the ingredients of the mixture, two or more feed screw arrangements similar to the one shown in Figures 1 and 2 would be provided. In this event the feed screws would be connected together and operated by an external prime mover in a manner similar to the pump arrangement shown in Figure 3. It is to be understood that any number and arrangement of delivery units may be provided, depending upon the number and kind of ingredients to go into the final mixture.

We claim:

Apparatus for mixing and proportioning a dry ingredient with a fluid, comprising a mixing tank, stirring means in the tank, a discharge duct adjacent the bottom of the tank, a constant displacement pump connected with a supply of the fluid and discharging into the top of the tank, means for driving the pump, a hopper for holding a supply of the dry ingredient and arranged above the tank, a duct connected with the hopper and depending downwardly with its discharge end adjacent the top of the tank, a feed screw in the duct adjacent the hopper, means for stirring the ingredient in the hopper, means connecting the feed screw for rotation with said pump, and means interposed in the connecting means for varying the speed of the feed screw relative to said pump.

CARL J. MORONEY.
WILLIAM O. WITHERSPOON.